US012610324B2

(12) United States Patent
Jang et al.

(10) Patent No.: US 12,610,324 B2
(45) Date of Patent: Apr. 21, 2026

(54) MAXIMUM POWER REDUCTION

(71) Applicant: LG ELECTRONICS INC., Seoul (KR)

(72) Inventors: Jaehyuk Jang, Seoul (KR); Suhwan Lim, Seoul (KR); Yoonoh Yang, Seoul (KR); Sangwook Lee, Seoul (KR); Jinyup Hwang, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 317 days.

(21) Appl. No.: 17/881,083

(22) Filed: Aug. 4, 2022

(65) Prior Publication Data

US 2023/0053264 A1     Feb. 16, 2023

(30) Foreign Application Priority Data

Aug. 6, 2021     (KR) ........................ 10-2021-0103917

(51) Int. Cl.
| | |
|---|---|
| *H04W 52/36* | (2009.01) |
| *H04L 1/00* | (2006.01) |
| *H04L 27/26* | (2006.01) |
| *H04W 52/14* | (2009.01) |

(52) U.S. Cl.
CPC ......... *H04W 52/367* (2013.01); *H04L 1/0003* (2013.01); *H04L 27/2636* (2013.01); *H04W 52/146* (2013.01)

(58) Field of Classification Search
CPC .......................... H04W 52/367; H04W 52/146; H04L 1/0003; H04L 27/2636
See application file for complete search history.

(56) References Cited

U.S. PATENT DOCUMENTS

| | | | |
|---|---|---|---|
| 2015/0245302 A1 | 8/2015 | Lim et al. | |
| 2016/0345298 A1 | 11/2016 | Frank | |
| 2017/0238266 A1 | 8/2017 | Frank | |
| 2018/0098291 A1* | 4/2018 | Fodor | ................. H04W 52/346 |

OTHER PUBLICATIONS

3GPP TS 38.101-1 v17.2.0 (Year: 2021).*
"3rd Generation Partnership Project; Technical Specification Group Radio Access Network; NR; User Equipment (UE) radio transmission and reception; Part 2: Range 2 Standalone (Release 17)", 3GPP TS 38.101-2 V17.2.0 (Jun. 2021), Jul. 7, 2021.

* cited by examiner

*Primary Examiner* — Brian P Cox
(74) *Attorney, Agent, or Firm* — BRYAN CAVE LEIGHTON PAISNER LLP

(57) ABSTRACT

A disclosure of this specification provides a device configured to operate in a wireless system, the device comprising: dual transceiver; a processor operably connectable to the dual transceiver, wherein the processor is configured to: set a configured maximum output power based on a maximum power reduction (MPR) value; determine an uplink transmission power based on the configured maximum output power; and control the dual transceiver to transmit a uplink signal with the uplink transmission power, wherein the device supports power class 1.5, wherein the MPR value is for Inner RB allocations, wherein the MPR value is preconfigured based on modulation type for the uplink signal.

13 Claims, 9 Drawing Sheets 1. setting a configured maximum output power based on a maximum power reduction (MPR) value 2. determining an uplink transmission power based on the configured maximum output power 3. transmitting a uplink signal with the uplink transmission power by dual transceiver of the device

FIG. 1

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

100 —    Reduced Power

100
Network Signal

Reduced Power

FIG. 8

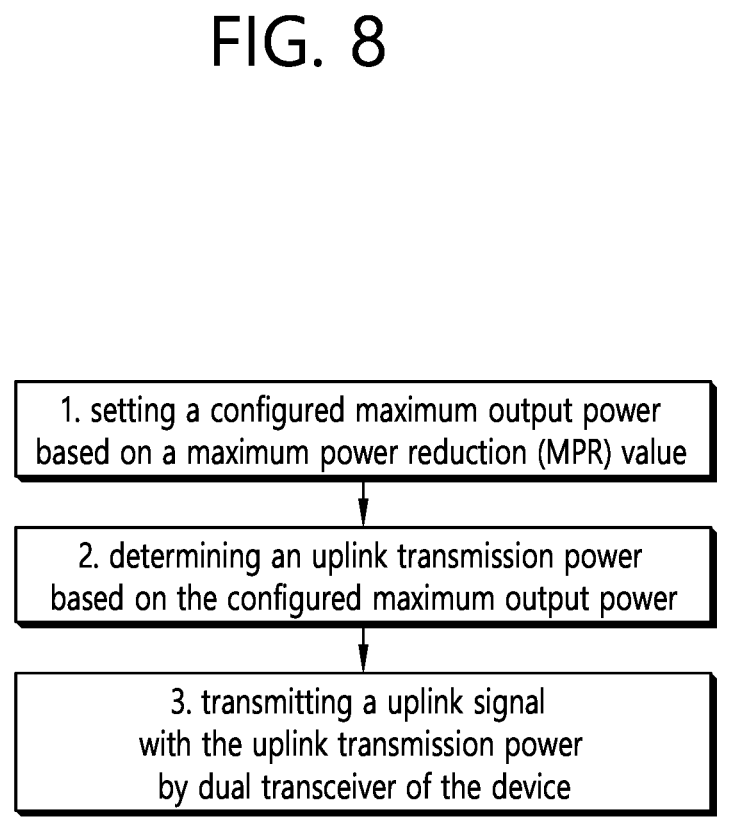

1. setting a configured maximum output power
based on a maximum power reduction (MPR) value 2. determining an uplink transmission power
based on the configured maximum output power 3. transmitting a uplink signal
with the uplink transmission power
by dual transceiver of the device

MAXIMUM POWER REDUCTION

CROSS-REFERENCE TO RELATED APPLICATIONS

Pursuant to 35 U.S.C. § 119(a), this application claims the benefit of Korean Patent Application No. 10-2021-0103917 filed on Aug. 6, 2021 the content of which is all hereby incorporated by reference herein in their entirety.

BACKGROUND OF THE DISCLOSURE

Field of the Disclosure

The present disclosure relates to mobile communication.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In 5G NR, the UE may determine transmission power by applying maximum output power requirements (or requirements). For example, the maximum output power requirement may be a Maximum Power Reduction (MPR) value.

The power class refers to the maximum output for all transmission bandwidths within the channel bandwidth of the NR carrier, and is measured in one subframe (1 ms) period.

It is necessary to define MPR value for Power Class 1.5 UE.

SUMMARY OF THE DISCLOSURE

In accordance with an embodiment of the present disclosure, a disclosure of this specification provides a device configured to operate in a wireless system, the device comprising: dual transceiver; a processor operably connectable to the dual transceiver, wherein the processor is configured to: set a configured maximum output power based on a maximum power reduction (MPR) value; determine an uplink transmission power based on the configured maximum output power; and control the dual transceiver to transmit a uplink signal with the uplink transmission power, wherein the device supports power class 1.5, wherein the MPR value is for Inner RB allocations, wherein the MPR value is preconfigured based on modulation type for the uplink signal.

The present disclosure can have various advantageous effects.

For example, by performing disclosure of this specification, UE can transmit uplink signal with MPR.

Advantageous effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 8 shows a procedure of device according to the disclosure of the present specification.

DESCRIPTION OF EXEMPLARY EMBODIMENTS

Figure 2:
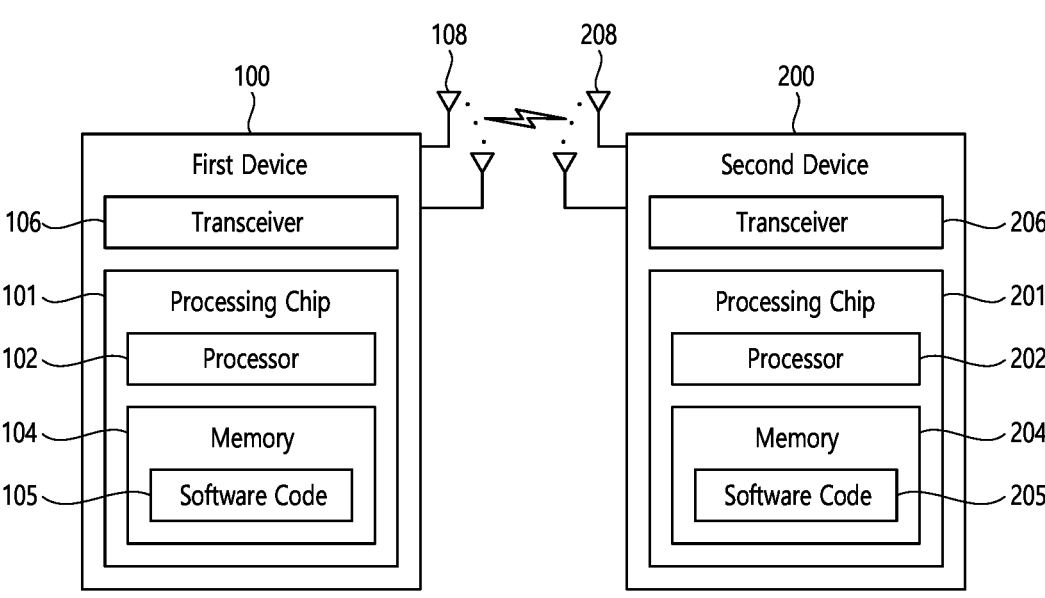
FIG. 2 shows an example of wireless devices to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is apart of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
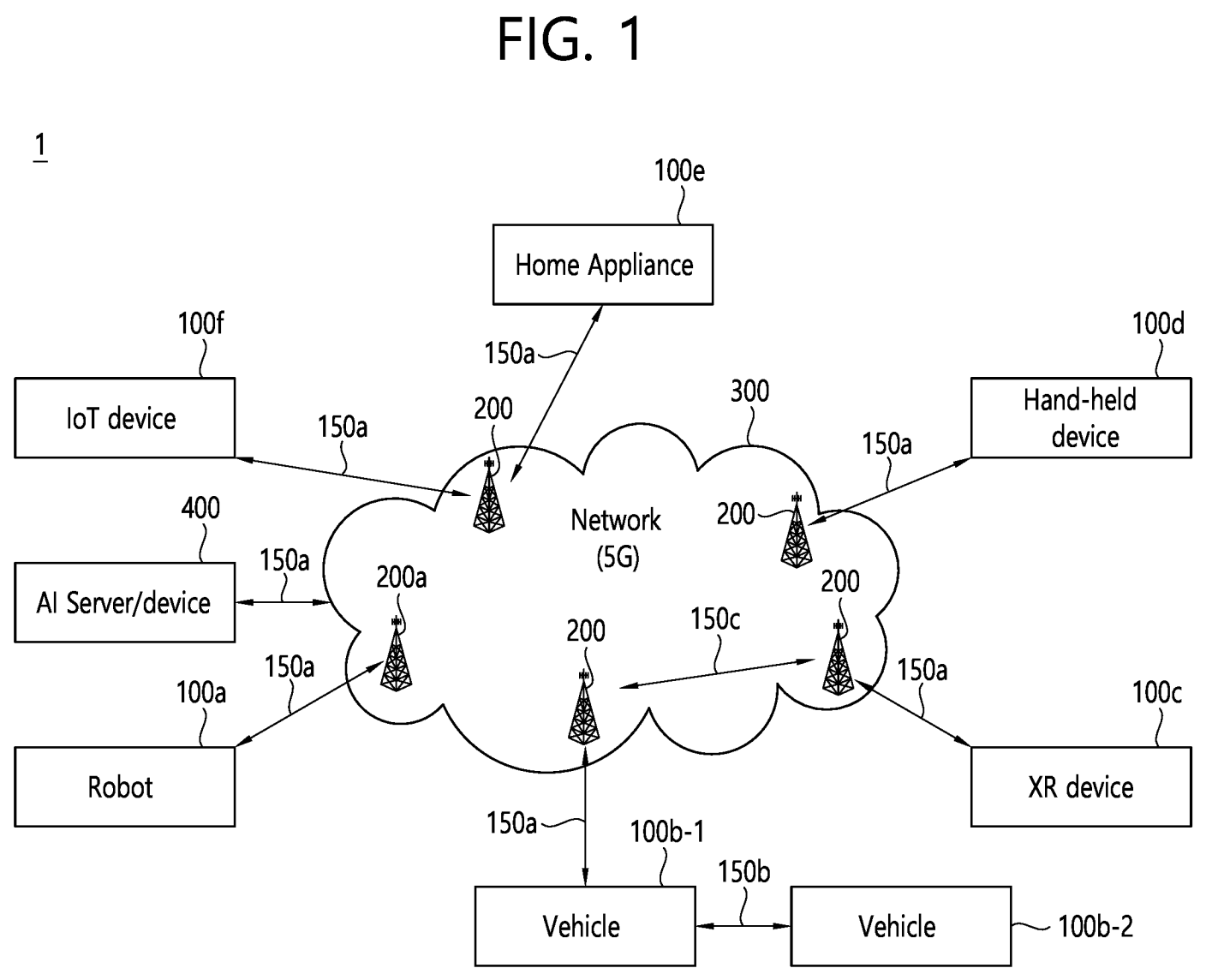

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (JAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names.

For example, ZigBee technology may generate personal area networks (PANs) associated with small/low-power digital communication based on various specifications such as IEEE 802.15.4 and may be called various names.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
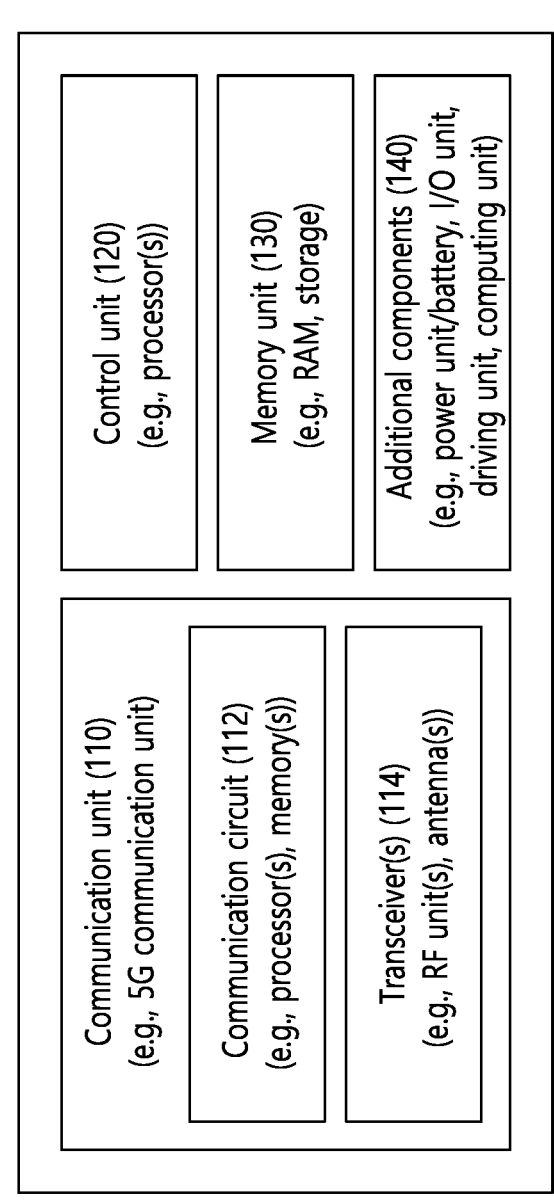
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
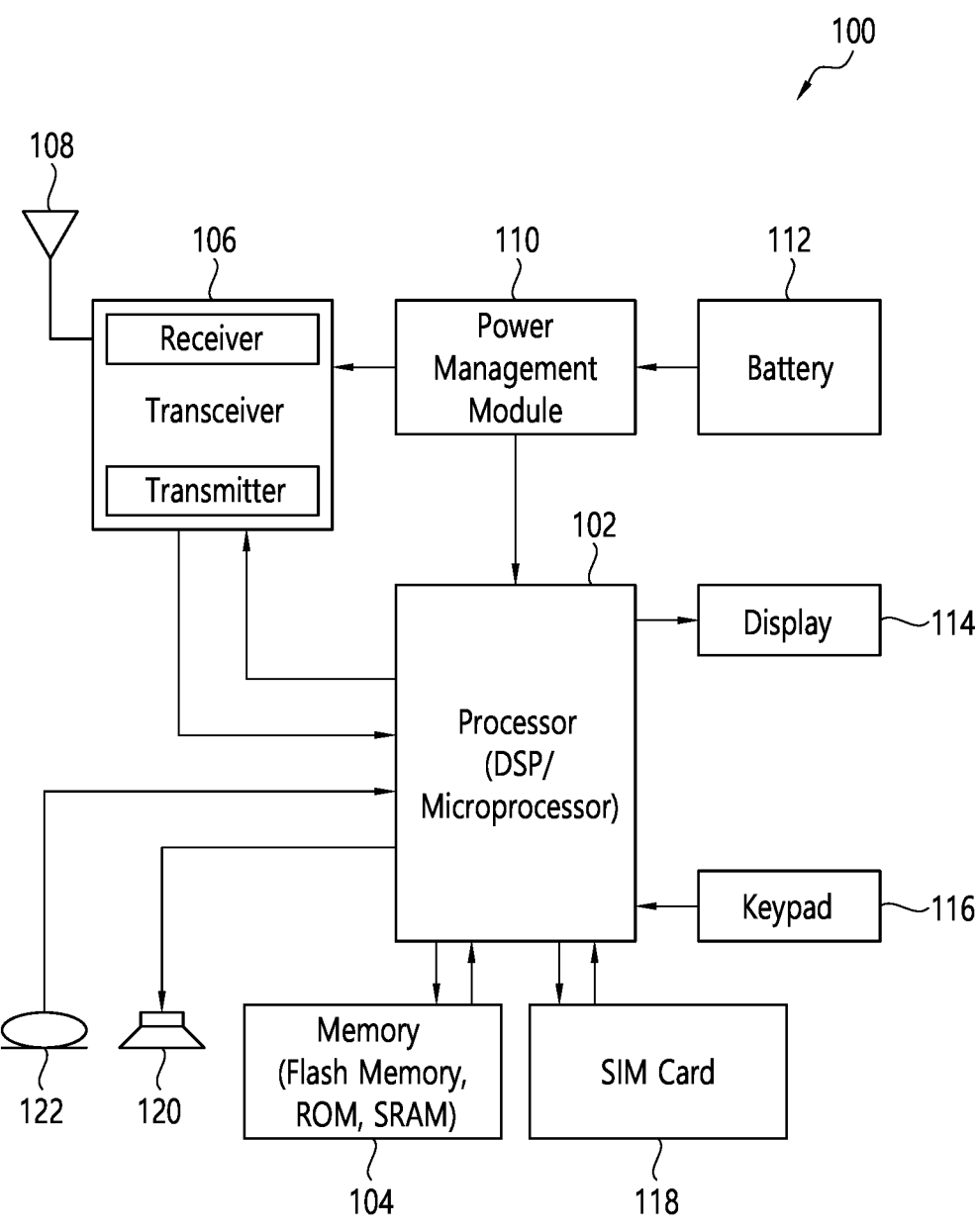
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad

116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
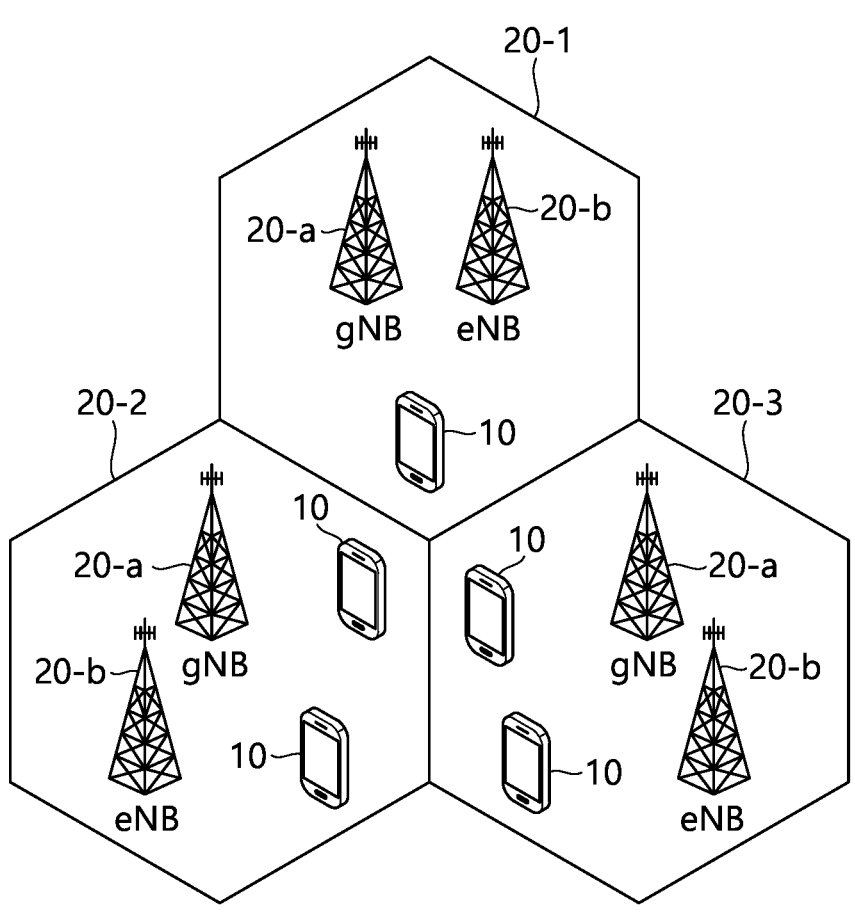
FIG. 5 is an example of a wireless communication system.

FIG. 5 is an example of a wireless communication system.

As can be seen with reference to FIG. 5, a wireless communication system includes at least one base station (BS). The BS is divided into a gNodeB (or gNB) 20a and an eNodeB (or an eNB) 20b. The gNB 20a supports 5G mobile communication. The eNB 20*b* supports 4G mobile communication, that is, long term evolution (LTE).

Each base station 20*a* and 20*b* provides a communication service for a specific geographic area (generally referred to as a cell) (20-1, 20-2, and 20-3). A cell may be again divided into a plurality of regions (referred to as sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Figure 6:
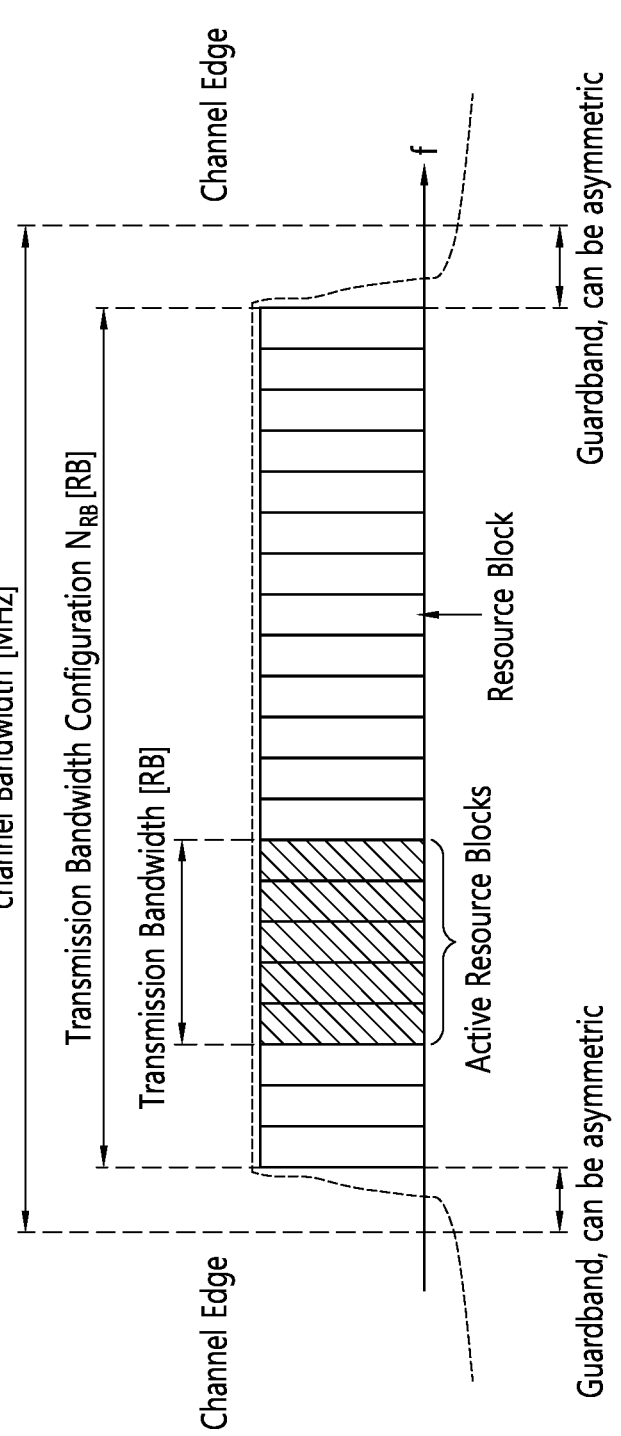
FIG. 6 shows definition of channel bandwidth and transmission bandwidth configuration for one NR channel.

FIG. 6 shows definition of channel bandwidth and transmission bandwidth configuration for one NR channel.

The number of RBs configured in any channel bandwidth shall ensure that the minimum guardband is met.

The terminal may be allocated a channel bandwidth and use it for signal transmission. The channel band consists of two guard bands at the edges and RBs as many as the number of NRB in the middle. That is, the NRB refers to the number of RBs allocated for signal transmission. Therefore, NRB is the maximum number of RBs considering the channel bandwidth and SCS. The signal may be transmitted using some RBs as part of the allocated NRB RBs. The first RB among some used RBs is called startRB.

NRB corresponds to an integer. Each of the plurality of allocated RBs may be numerically numbered in the order of frequency, up to the NRB.

<UE Maximum Output Power>

For UE with two transmit antenna connectors in closed-loop spatial multiplexing scheme, the maximum output power for any transmission bandwidth within the channel bandwidth is specified in Table 3. The requirements shall be met with the UL MIMO configurations specified in Table 4. For UE supporting UL MIMO, the maximum output power is defined as the sum of the maximum output power from both UE antenna connectors. The period of measurement shall be at least one sub frame (1 ms).

The requirements shall be met with the UL MIMO configurations of using 2-layer UL MIMO transmission with codebook of 0.50.5*[1 0; 0 1]. DCI Format for UE configured in PUSCH transmission mode for uplink single-user MIMO shall be used.

Table 3 shows UE Power Class for UL MIMO in closed loop spatial multiplexing scheme.

TABLE 3

| NR band | Class 1.5 (dBm) | Tolerance (dB) | Class 2 (dBm) | Tolerance (dB) | Class 3 (dBm) | Tolerance (dB) | Class 4 (dBm) | Tolerance (dB) |
|---|---|---|---|---|---|---|---|---|
| n1 | | | | | 23 | +2/−3 | | |
| n2 | | | | | 23 | +2/−31 | | |
| n3 | | | | | 23 | +2/−31 | | |
| n7 | | | | | 23 | +2/−31 | | |
| n25 | | | | | 23 | +2/−31 | | |
| n30 | | | | | 23 | +2/−3 | | |
| n34 | | | | | 23 | +2/−3 | | |
| n38 | | | | | 23 | +2/−3 | | |
| n39 | | | | | 23 | +2/−3 | | |
| n40 | | | | | 23 | +2/−3 | | |
| n41 | 29 | +2/−3[1] | 26 | +2/−3[1] | 23 | +2/−3[1] | | |
| n48 | | | | | 23 | +2/−3 | | |
| n66 | | | | | 23 | +2/−3 | | |
| n70 | | | | | 23 | +2/−3 | | |
| n71 | | | | | 23 | +2/−3 | | |
| n77 | | | 26 | +2/−3 | 23 | +2/−3 | | |
| n78 | | | 26 | +2/−3 | 23 | +2/−3 | | |
| n79 | | | 26 | +2/−3 | 23 | +2/−3 | | |
| n80 | | | | | 23 | +2/−3[1] | | |
| n84 | | | | | 23 | +2/−3 | | |

TABLE 3-continued

| NR band | Class 1.5 (dBm) | Tolerance (dB) | Class 2 (dBm) | Tolerance (dB) | Class 3 (dBm) | Tolerance (dB) | Class 4 (dBm) | Tolerance (dB) |
|---|---|---|---|---|---|---|---|---|
| n95 | | | | | 23 | +2/−3 | | |
| n97 | | | | | 23 | +2/−3 | | |
| n98 | | | | | 23 | +2/−3 | | |

NOTE 1:

The transmission bandwidths confined within $F_{UL\_low}$ and $F_{UL\_low}$ + 4 MHz or $F_{UL\_high}$ − 4 MHz and $F_{UL\_high}$, the maximum output power requirement is relaxed by reducing the lower tolerance limit by 1.5 dB

NOTE 2:

Power class 3 is the default power class unless otherwise stated

Table 4 shows UL MIMO configuration in closed-loop spatial multiplexing scheme.

TABLE 4

| Transmission scheme | DCI format | Number of layers | TPMI index |
|---|---|---|---|
| Codebook based uplink | DCI format 0_1 | 2 | 0 |

NOTE 1:

The UE is configured with one SRS resource with the parameter nrofSRS-Ports set to 2.

For UE support uplink full power transmission (ULFPTx) for UL MIMO, the maximum output power requirements specified in Table 3 shall be met with the PUSCH configurations specified in Table 5, based upon UE's support of uplink full power transmission mode.

Table 5 shows PUSCH Configuration for uplink full power transmission (ULFPTx).

TABLE 5

| ULFP Tx Mode | Trans-mission scheme | DCI format | Modulation | Number of layers | Number of Tx Port | TPMI index |
|---|---|---|---|---|---|---|
| Mode-1 | Codebook based uplink | DCI format 0_1 | DFT-s-OFDM, CP-OFDM$^{NOTE3}$ | 1 | 2 | 2 |
| Mode-2 | Codebook based uplink | DCI format 0_1 | DFT-s-OFDM, CP-OFDM | 1 | 2 | 0 or 1$^{NOTE2}$ |
| Mode-full power | Codebook based uplink | DCI format 0_1 | DFT-s-OFDM, CP-OFDM | 1 | 2 | 0, 1 |

NOTE 1:

The UE is configured with one SRS resource with the parameter nrofSRS-Ports set to 2.

NOTE 2:

TPMI index selected shall be based upon the full power TPMI reported by the UE

NOTE 3:

For PUSCH configured with ULFPTxModes set to Mode-1, all the transmitter requirement for CP-OFDM based modulation is not needed to be verified if the requirement for UL MIMO has been validated.

If UE is scheduled for single antenna-port PUSCH transmission by DCI format 00 or by DCI format 0_1 for single antenna port codebook based transmission, the requirements in clause 6.2.1 apply for the power class as indicated by the ue-PowerClass field in capability signalling.

<Maximum Power Reduction (MPR) and Allowed Additional MPR (A-MPR)>

Figure 7A:
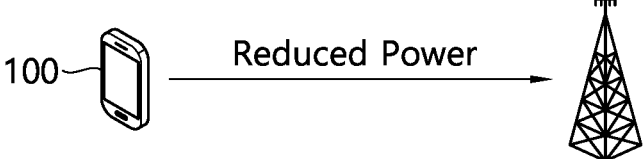
FIGS. 7a and 7b show an example of a method of limiting transmission power of a terminal.
Figure 7B:
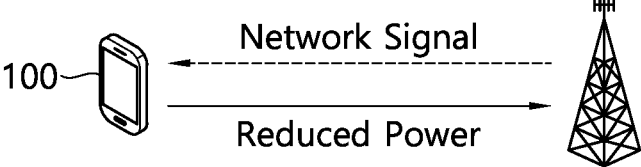

FIGS. 7a and 7b show an example of a method of limiting transmission power of a terminal.

Referring to FIG. 7a, the terminal 100 may perform transmission with limited transmission power. For example, the terminal 100 may perform uplink transmission for the base station through reduced transmission power.

When a peak-to-average power ratio (PAPR) value of a signal transmitted from the terminal 100 increases, in order to limit the transmission power, the terminal 100 applies a maximum output power reduction (MPR) value to the transmission power, thereby reducing linearity of a power amplifier PA inside the transceiver of the terminal 100.

Referring to FIG. 7b, a base station (BS) may request the terminal 100 to apply A-MPR by transmitting a network signal (NS) to the terminal 100. In order not to affect adjacent bands, etc., an operation related to A-MPR may be performed. Unlike the MPR described above, the operation related to the A-MPR is an operation in which the base station transmits NS to the terminal 100 operating in a specific operating band so that the terminal additionally performs power reduction. That is, when the terminal to which MPR is applied receives the NS, the terminal may determine transmission power by additionally applying A-MPR.

<Problems to be Solved in the Disclosure of this Specification>

There was no prior art/performance requirement according to UE type for the maximum output power reduction (MPR) of the PC1.5 high-output NR UE.

PC1.5 (power class 1.5) UE can transmit signal with 29 dBm output.

Therefore, it is necessary to analyze the MPR of PC1.5 high-power NR terminals according to Smartphone and FWA (Fixed Wireless Access) type.

<Disclosure of the Present Specification>

EVM Re-measurement results may be provided. New Inner MPR values for PC1.5 may be proposed.

1. Measurement Assumptions for MPR

There may be the Following measurement assumptions for MPR may be assumed.

Antenna isolation of 10 dB

Post PA loss of 4 dB

Two 26 dBm Tx chains (NR)

Equal Power on both transmit chains

Various channel and allocation BWs, with focus on "worst case" allocations

RB size, allocation position, waveform, and modulation should be the same between two transmitters Results for both CP-OFDM and DFT-S-OFDM are welcome, with the priority being CP-OFDM because it is expected to be worst case Determine back-off required to meet OOBE, ACLR and EVM specifications The purpose of the test is to check whether the inner RB MPR can be improved.

2. Measurement Results

Our EVM Re-measurement results for PC1.5 may be provided in this section. Evaluating the inner RB MPR was focused.

Table 6 shows PC1.5 EVM measurement results of DFT-s-OFDM by using 3GPP MPR.

TABLE 6

| | Modulation | Increased EVM due to RIMD3 [%] Inner RB allocations (135RB@67) |
|---|---|---|
| DFT-s-OFDM | Pi/2 BPSK [30%] | +0.75 |
| | QPSK [17.5%] | +1.23 |
| | 16 QAM [12.5%] | +0.5 |
| | 64 QAM [8%] | +0.97 |
| | 256 QAM [3.5%] | +0.62 |

Table 7 shows PC1.5 EVM measurement results of CP-OFDM by using 3GPP MPR.

TABLE 7

| | Modulation | Increased EVM due to RIMD3 [%] Inner RB allocations (137RB@68) |
|---|---|---|
| CP-OFDM | QPSK [17.5%] | +1.91 |
| | 16 QAM [12.5%] | +1.64 |
| | 64 QAM [8%] | +1.87 |
| | 256 QAM [3.5%] | +0.72 |

Table 8 shows PC1.5 EVM measurement results of DFT-s-OFDM by using 3GPP MPR with additional MPR relaxation values 1 dB.

TABLE 8

| | Modulation | Increased EVM due to RIMD3 [%] Inner RB allocations (135RB@67) |
|---|---|---|
| DFT-s-OFDM | Pi/2 BPSK [30%] | +0.07 |
| | QPSK [17.5%] | +0.48 |
| | 16 QAM [12.5%] | +0.05 |
| | 64 QAM [8%] | +0.19 |
| | 256 QAM [3.5%] | +0.24 |

Table 9 shows PC1.5 EVM measurement results of CP-OFDM by using 3GPP MPR with additional MPR relaxation values 1 dB.

TABLE 9

| | Modulation | Increased EVM due to RIMD3 [%] Inner RB allocations (137RB@68) |
|---|---|---|
| CP-OFDM | QPSK [17.5%] | +0.57 |
| | 16 QAM [12.5%] | +0.32 |
| | 64 QAM [8%] | +0.41 |
| | 256 QAM [3.5%] | +0.38 |

Our EVM measurements for PC1.5 may be found in Tables 3, 4, 5, and 6.

Based on our EVM measurement results for PC1.5, 1 dB additional relaxation may be needed due to EVM.

For Inner RB allocations, MPR relaxation for 256QAM modulation may be 1.5 dB.

Table 10 shows Proposed MPR for PC1.5.

TABLE 10

| Modulation | | MPR (dB) Inner RB allocations |
|---|---|---|
| DFT-s-OFDM | Pi/2 BPSK | $\leq 1 \pm \alpha$ |
| | QPSK | $\leq 1 \pm \alpha$ |
| | 16 QAM | $\leq 2 \pm \alpha$ |
| | 64 QAM | $\leq 3.5 \pm \alpha$ |
| | 256 QAM | $\leq 6 \pm \alpha$ |
| CP-OFDM | QPSK | $\leq 2.5 \pm \alpha$ |
| | 16 QAM | $\leq 3 \pm \alpha$ |
| | 64 QAM | $\leq 4.5 \pm \alpha$ |
| | 256 QAM | $\leq 8 \pm \alpha$ |

The MPR values in Table 10 may have $\pm\alpha$ tolerance and a may be 0, 0.1, 0.2, 0.3, . . . , 3.0.

In case that modulation is DFT-s-OFDM and Pi/2 BPSK, MPR for inner RB allocations may be less than or equal to $1\pm\alpha$.

In case that modulation is DFT-s-OFDM and QPSK, MPR for inner RB allocations may be less than or equal to $1\pm\alpha$.

In case that modulation is DFT-s-OFDM and 16 QAM, MPR for inner RB allocations may be less than or equal to $2\pm\alpha$.

In case that modulation is DFT-s-OFDM and 64 QAM, MPR for inner RB allocations may be less than or equal to $3.5\pm\alpha$.

In case that modulation is DFT-s-OFDM and 256 QAM, MPR for inner RB allocations may be less than or equal to $6\pm\alpha$.

In case that modulation is CP-OFDM and QPSK, MPR for inner RB allocations may be less than or equal to $2.5\pm\alpha$.

In case that modulation is CP-OFDM and 16 QAM, MPR for inner RB allocations may be less than or equal to $3\pm\alpha$.

In case that modulation is CP-OFDM and 64 QAM, MPR for inner RB allocations may be less than or equal to $4.5\pm\alpha$.

In case that modulation is CP-OFDM and 256 QAM, MPR for inner RB allocations may be less than or equal to $8\pm\alpha$.

MPR for PC1.5 UL-MIMO in table 10 may be proposed.

The plurality of RBs may be divided into three zones, and the A-MPR value may be determined. NRB RBs may be divided into 3 zones (Edge RB allocations, Outer RB allocations, Inner RB allocations).

$RB_{Start,Low}$ corresponds to max(1, floor($N_{RB}/2$)). Here, the max(x, y) function is a function that outputs the higher of x and y. Therefore, $RB_{Start,Low}$ becomes the higher number of 1 and floor(NRB/2). If NRB is greater than 2, $RB_{Start,Low}$ may be floor($N_{RB}/2$). Here, the floor(x) function is a function that outputs the largest integer among integers less than or equal to x. For example, if x is 2.4, floor(x) is 2, and if x is 3, floor(x) is 3.

$RB_{Start,High}$ correspond to $N_{RB}$-$RB_{Start,Low}$-$L_{CRB}$. Here, $L_{CRB}$ must be less than or equal to ceil($N_{RB}/2$). Here, ceil(x) function is a function that outputs the smallest integer among integers greater than or equal to x. For example, if x is 2.4, ceil(x) is 3, and if x is 3, ceil(x) is 3.

Inner RB allocation refers to an RB whose RB number is greater than or equal to $RB_{Start,Low}$ and less than or equal to $RB_{Start,High}$.

Edge RB allocation refers to the one for which the RB(s) is (are) allocated at the lowermost or uppermost edge of the channel with $L_{CRB} \leq 4$ RBs for power class 1.5 and $L_{CRB} \leq 2$ RBs for other power classes.

The RB allocation is an Outer RB allocation for all other allocations which are not an Inner RB allocation or Edge RB allocation.

QPSK is a modulation method with a modulation order of 4, 16QAM is a modulation method with a modulation order of 16, 64QAM is a modulation method with a modulation order of 64, and 256QAM refers to a modulation method with a modulation order of 256.

FIG. 8 shows a procedure of device according to the disclosure of the present specification.

The device may set a configured maximum output power based on a maximum power reduction (MPR) value.

The device may determine an uplink transmission power based on the configured maximum output power, The device may transmit an uplink signal with the uplink transmission power by dual transceiver of the device, The device may support power class 1.5, The MPR value may be for Inner RB allocations, The MPR value may be preconfigured based on modulation type for the uplink signal.

The MPR value may be less than or equal to 1, based on the modulation type being DFT-s-OFDM and Pi/2 BPSK.

The MPR value may be less than or equal to 1, based on the modulation type being DFT-s-OFDM and QPSK.

The MPR value may be less than or equal to 2, based on the modulation type being DFT-s-OFDM and 16 QAM.

The MPR value may be less than or equal to 3.5, based on the modulation type being DFT-s-OFDM and 64 QAM.

The MPR value may be less than or equal to 6, based on the modulation type being DFT-s-OFDM and 256 QAM.

The MPR value may be less than or equal to 2.5, based on the modulation type being CP-OFDM and QPSK.

The MPR value may be less than or equal to 3, based on the modulation type being CP-OFDM and 16 QAM.

The MPR value may be less than or equal to 4.5, based on the modulation type being CP-OFDM and 64 QAM.

The MPR value may be less than or equal to 8, based on the modulation type being CP-OFDM and 256 QAM.

The Inner RB allocations may be an RB whose RB number is greater than or equal to $\max(1, \text{floor}(NRB/2))$ and less than or equal to $NRB-\max(1, \text{floor}(NRB/2))-L_{CRB}$.

The $N_{RB}$ may be the number of allocated RBs for transmission,

The $L_{CRB}$ be less than or equal to $\text{ceil}(N_{RB}/2)$.

Hereinafter, a device configured to operate in a wireless system, according to some embodiments of the present disclosure, will be described.

For example, a terminal may include a processor, dual transceiver, and a memory.

For example, the processor may be configured to be coupled operably with the memory and the processor.

The processor may be configured to determine an uplink transmission power based on a maximum power reduction (MPR) value; and control the dual transceiver to transmit a uplink signal with the uplink transmission power, wherein the device supports power class 1.5, wherein the MPR value is for Inner RB allocations, wherein the MPR value is preconfigured based on modulation type for the uplink signal.

Hereinafter, a processor in a wireless communication system, according to some embodiments of the present disclosure, will be described.

The processor may be configured to determine an uplink transmission power based on a maximum power reduction (MPR) value; and control the dual transceiver to transmit a uplink signal with the uplink transmission power, wherein the device supports power class 1.5, wherein the MPR value is for Inner RB allocations, wherein the MPR value is preconfigured based on modulation type for the uplink signal.

Hereinafter, a non-transitory computer-readable medium has stored thereon a plurality of instructions in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a base station.

The stored a plurality of instructions may cause the terminal to determine an uplink transmission power based on a maximum power reduction (MPR) value; and control the dual transceiver to transmit a uplink signal with the uplink transmission power, wherein the device supports power class 1.5, wherein the MPR value is for Inner RB allocations, wherein the MPR value is preconfigured based on modulation type for the uplink signal.

The present disclosure can have various advantageous effects.

For example, by performing disclosure of this specification, UE can transmit uplink signal with MPR.

Advantageous effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A device, comprising:
a dual transceiver;
at least one memory; and
at least one processor,
wherein the at least one memory stores instructions that, based on being executed by the at least one processor, cause the at least one processor to perform operations comprising:
setting a configured maximum output power based on a maximum power reduction (MPR) value;
determining an uplink transmission power based on the configured maximum output power; and
transmitting an uplink signal with the uplink transmission power,
wherein the MPR value is for power class 1.5,
wherein the MPR value is less than or equal to 3.5 dB, based on i) a modulation type being Discrete Fourier Transform spread Orthogonal Frequency Division Multiplexing (DFT-s-OFDM) and 64 quadrature amplitude modulation (QAM) and ii) resource block (RB) allocations being Inner RB allocations.

2. The device of claim 1,
wherein the MPR value is less than or equal to 1 dB, based on i) the modulation type being DFT-s-OFDM and Pi/2 BPSK and ii) the RB allocation being Inner RB allocations.

3. The device of claim 1,
wherein the MPR value is less than or equal to 1 dB, based on i) the modulation type being DFT-s-OFDM and QPSK and ii) the RB allocation being Inner RB allocations.

4. The device of claim 1,
wherein the MPR value is less than or equal to 2 dB, based on i) the modulation type being DFT-s-OFDM and 16 QAM and ii) the RB allocation being Inner RB allocations.

5. The device of claim 1,
wherein the MPR value is less than or equal to 6 dB, based on i) the modulation type being DFT-s-OFDM and 256 QAM and ii) the RB allocation being Inner RB allocations.

6. The device of claim 1,
wherein the MPR value is less than or equal to 2.5 dB, based on i) the modulation type being CP-OFDM and QPSK and ii) the RB allocation being Inner RB allocations.

7. The device of claim 1,
wherein the MPR value is less than or equal to 3 dB, based on i) the modulation type being CP-OFDM and 16 QAM and ii) the RB allocation being Inner RB allocations.

8. The device of claim 1,
wherein the MPR value is less than or equal to 4.5 dB, based on i) the modulation type being Cyclic Prefix OFDM (CP-OFDM) and 64 QAM and ii) the RB allocation being Inner RB allocations.

9. The device of claim 1,
wherein the MPR value is less than or equal to 8 dB, based on i) the modulation type being CP-OFDM and 256 QAM and ii) the RB allocation being Inner RB allocations.

10. The device of claim 1,
wherein the Inner RB allocations is an RB whose RB number is greater than or equal to max(1, floor (NRB/2)) and less than or equal to NRB-max(1, floor (NRB/2))-LCRB,
wherein the NRB is the number of allocated RBs for transmission,
wherein the LCRB is less than or equal to ceil (NRB/2).

11. A method, comprising:
setting, by a user equipment (UE), a configured maximum output power based on a maximum power reduction (MPR) value;
determining, by the UE, an uplink transmission power based on the configured maximum output power; and
transmitting, by the UE, an uplink signal with the uplink transmission power,
wherein the MPR value is for power class 1.5,
wherein the MPR value is less than or equal to 3.5 dB, based on i) a modulation type being Discrete Fourier Transform spread Orthogonal Frequency Division Multiplexing (DFT-s-OFDM) and 64 quadrature amplitude modulation (QAM) and ii) resource block (RB) allocations being Inner RB allocations.

12. At least one non-transitory computer readable medium (CRM) storing instructions that, based on being executed by at least one processor, perform operations comprising:
setting a configured maximum output power based on a maximum power reduction (MPR) value;
determining an uplink transmission power based on the configured maximum output power; and
transmitting an uplink signal with the uplink transmission power,
wherein the MPR value is for power class 1.5,
wherein the MPR value is less than or equal to 3.5 dB, based on i) a modulation type being Discrete Fourier Transform spread Orthogonal Frequency Division Multiplexing (DFT-s-OFDM) and 64 quadrature amplitude modulation (QAM) and ii) resource block (RB) allocations being Inner RB allocations.

13. An apparatus in mobile communication, the apparatus comprising:
a processor; and
a memory coupled to the processor,
wherein the processor is configured to:
setting a configured maximum output power based on a maximum power reduction (MPR) value;
determining an uplink transmission power based on the configured maximum output power; and
transmitting an uplink signal with the uplink transmission power,
wherein the MPR value is for power class 1.5,
wherein the MPR value is less than or equal to 3.5 dB, based on i) a modulation type being Discrete Fourier Transform spread Orthogonal Frequency Division Multiplexing (DFT-s-OFDM) and 64 quadrature amplitude modulation (QAM) and ii) resource block (RB) allocations being Inner RB allocations.

* * * * *